United States Patent [19]

Kim

[11] Patent Number: 5,290,363
[45] Date of Patent: Mar. 1, 1994

[54] METHOD FOR WIPING A WINDSHIELD

[76] Inventor: Kwang M. Kim, 387-13 Acheon-Dong, Koori, Kyunggi-Do, Rep. of Korea

[21] Appl. No.: 688,245

[22] Filed: Apr. 22, 1991

[30] Foreign Application Priority Data

Apr. 20, 1990 [KR]  Rep. of Korea ............ 90-5570

[51] Int. Cl.⁵ ............ B60S 1/02; B60S 1/04; B08B 1/00; A47L 1/00
[52] U.S. Cl. ................. 134/6; 134/42; 15/103; 15/97.1; 15/97.3; 15/114; 15/118; 15/250.22
[58] Field of Search ............ 15/103, 97.1, 97.3, 15/114, 118, 250.22; 134/6, 42

[56] References Cited

U.S. PATENT DOCUMENTS 3,892,006  7/1975  Yasumoto ............ 15/250.06
3,919,734 11/1975  Mosley ............... 15/250.06
4,105,248  8/1978  Lake .................. 15/250.22

Primary Examiner—R. Bruce Breneman
Assistant Examiner—Zeinab El-Arini

[57] ABSTRACT

A method for wiping and cleaning a windshield for a vehicle includes rotating a pair of circular windshield portions of the windshield against a brush containing moisture, and an apparatus therefor.

7 Claims, 2 Drawing Sheets

METHOD FOR WIPING A WINDSHIELD

BACKGROUND OF THE INVENTION

1. Field of the Invention

The present invention relates to a method and an apparatus for wiping and a windshield for vehicles such as motor vehicles. The present invention, more particularly, relates to a novel method for wiping and cleaning a windshield which comprises rotating a pair of circular windshield portions of the windshield against a moist brush.

2. Description of the Prior Art

Various types of windshield wiper assemblies for vehicles are well known in the art. Such windshield wiper assemblies suffer from a number of problems such as, for example, (a) when a pair of windshield wipers of such windshield assemblies operate on the surface of the windshield of the vehicles, since the wipers have a certain length and perform with a reciprocal angular movement, the windshield wipers obscures the vision of a driver and a passenger, and (b) the pair of windshield wipers of such windshield wiper assemblies can only wipe a certain portion of the windshield. Therefore, the driver cannot safely drive the vehicle since there is no clear field of view.

SUMMARY OF THE INVENTION

Accordingly, it is an object of the present invention to provide a novel method for wiping a windshield for motor vehicles and an apparatus therefor.

Another object of the present invention is to provide a novel method for wiping and cleaning a windshield for vehicles such as motor vehicles, which comprises rotating a pair of circular portions of the windshield against a brush containing moisture so that a driver can safely drive the vehicle with a clear field of view so as to avoid a number of car accidents.

A further object of the present invention is to provide a novel windshield wiping apparatus for a vehicle, comprising a pair of circular windshield portions, each of the pair of circular windshield portions being rotatably mounted to a pair of corresponding semi-circular apertures formed within the windshield and simultaneously, each rotatable within a hood frame of a vehicle, a pair of main shafts for rotatably supporting the pair of circular windshield portions, and a pair of motors for rotating the pair of circular windshield portions about the pair of shafts.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a method for wiping and cleaning a windshield for a vehicle, comprises rotating a pair of circular windshield portions of the windshield against a brush containing moisture, and an apparatus therefor.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
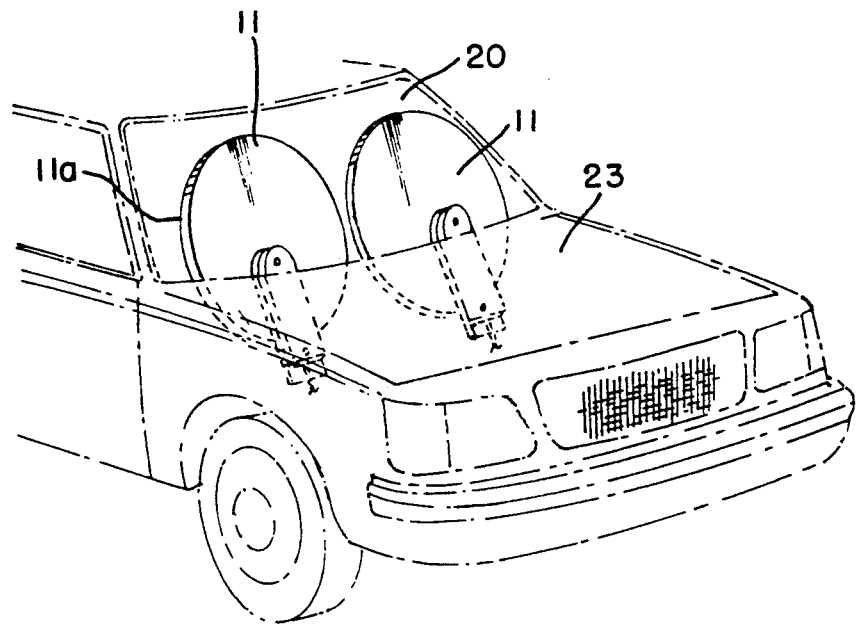
FIG. 1 is a perspective view of the apparatus for wiping a windshield according to the present invention showing the application to an automobile.
Figure 2:
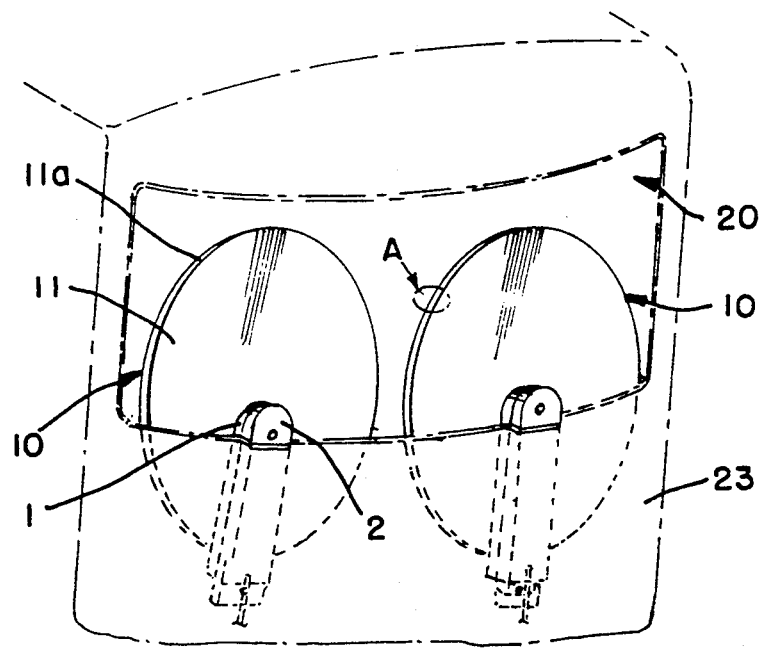
FIG. 2 is a perspective view of the apparatus for wiping a windshield according to the present invention showing the application to a truck.
Figure 3:
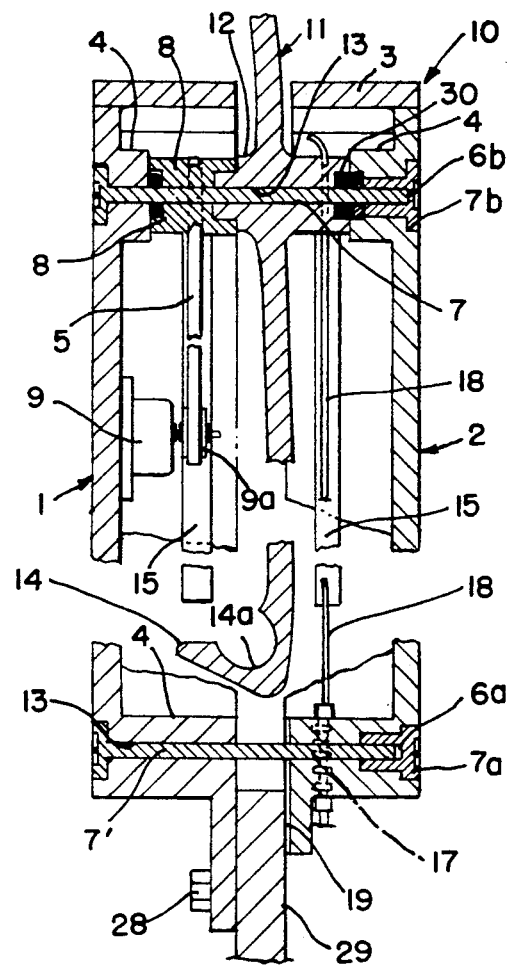
FIG. 3 is a sectional view of one of a pair of wiping members of the apparatus for wiping a windshield according to the present invention.

Referring now in detail to the drawings for the purpose of illustrating preferred embodiments of the present invention, the process for wiping a windshield for a vehicle and an apparatus therefore as shown in FIGS. 1, 2, and 3, comprises a pair of circular windshield members 10 including a pair of corresponding circular windshield portions 11 rotatably mounted to a pair of semi-circular apertures 11a of the windshield 20 and simultaneously built in a hood frame 23 of a the vehicle such as an automobile or a truck, and an apparatus therefor.

Each of the circular windshield members 10 includes an inner casing 1, an outer casing 2, a cover 3, a main pulley 8, a main shaft 7 rotatably passing through a horizontally elongated aperture 13 of the pulley 8 and a central portion 12 of the windshield portion 11, and a motor 9 fixed to the interior of the inner casing for rotating the main pulley 8 with the circular windshield portion 11 through a motor pulley 9a mounted to the motor 9 and a belt 5.

The inner and outer casings and 2 are provided with projecting portions 4 for rotatably supporting the main pulley 8 and the central portion 12 of the circular windshield portion 11 through bearings 30. Also, the main shaft 7 is fixed to the projecting portions 4 by using a nut 7b having a hollow portion 6a. A supporting shaft 7' supports the low portion of the inner and outer casings 1 and 2 by using a nut 7a having a hollow portion 6b.

Figure 4:
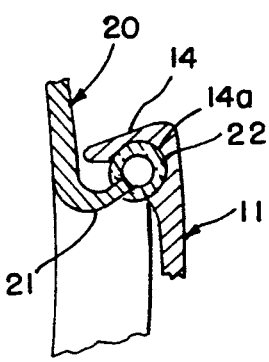
FIG. 4 is an enlarged sectional view of A of FIG. 2, showing a contacting area of a circular windshield portion and the windshield according to the present invention.

As shown in FIGS. 3 and 4, the circular windshield portion 11 includes an inner circumferential bent end 14 for forming a slot 14a so as to fixedly receive a slitted ring packing 22. The semi-circular aperture 11a of the windshield 20 also includes an outer circumferential bent 21 end for insertion into the slit ring packing 22 so as to slidably and tightly enable rotation of the circular windshield portion 11 along the semi-circular aperture 11a. The ring packing 22 is made of rubber or silicone rubber.

Figure 5:
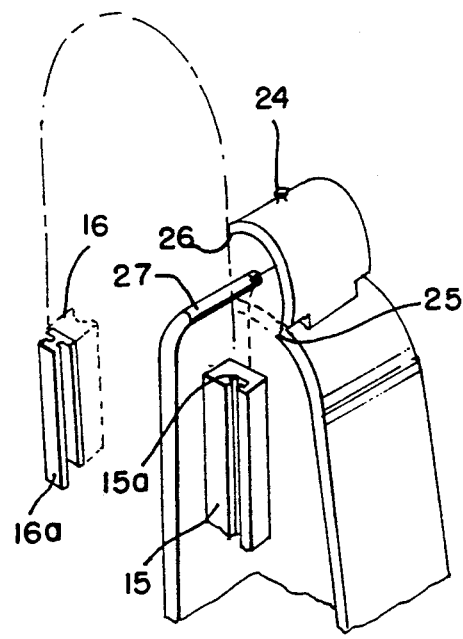
FIG. 5 is a perspective view of a brush assembly of the apparatus for wiping a windshield according to the present invention.

As shown in FIG. 5, the inner and outer casings 1 and 2 are provided with a guiding member 15 disposed in the interior thereof for embracing the front wall and back wall of the circular windshield portion 11, respectively. The guiding member 15 includes a T-shaped concave portion 15a for slidably receiving a T-shaped convex portion 16a of a brush 16 so as to efficiently wipe and clean the circular windshield portion 11. One end of the cover 3 having a handle 24 disposed on the top thereof is pivotally connected to one top of the inner casing 1 and the outer casing 2 by hinges 25, respectively. The other end 26 of the cover 3 is operatively connected to a locking attachment 27 of the other top of the inner and outer casings 1 and 2. The brush 16 contains moisture from a windshield liquid pipe 18. The brush 16 can be replaced with a new brush by opening the cover 3 by the handle 24. The liquid pipe 18 passes through a pipe passage 17 is connected to a windshield liquid supply tank (not shown). The waste liquid is drained by a drain pipe 19 disposed in the bottom of the outer casing 2. The pair of windshield wiping members 10 are supported on the hood frame 23 through a support 29 by a big bolt 28.

The method for wiping a windshield of the present invention comprises rotating the pair of circular windshield portions 11 by actuating the motor 9 through an on/off switch disposed on the dashboard of the vehicle (not shown). At this time, the belt 5 operatively connected to the motor pulley 9a causes the main pulley 8 to rotate so that the main pulley 8 rotates the pair of circular windshield portions 11 about the main shaft 7. Also, at that time, the brushes 16 with the windshield liquid supplied from the windshield liquid pipe 18 can aggressively wipe and clean both surfaces of the circular windshield portions 11.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for wiping a windshield of a vehicle, which comprises the steps of:
   actuating a motor;
   rotating a pair of circular windshield portions within a remainder of said windshield in response to actuating the motor; and
   wiping said rotating circular windshield portions with a brush on both surfaces of said rotating circular windshield portions at a location removed from a driver's field of view.

2. The method of claim 1, wherein the actuating motor includes a motor pulley operatively connected to a main pulley through a belt, said main pulley being mounted to said pair of circular windshield portions for smoothly rotating the pair of circular windshield portions about a shaft.

3. The method of claim 1, further including the step of applying moisture to said brush wherein the moisture of said brush is supplied by a windshield liquid pipe.

4. The method of claim 1, wherein the pair of circular windshield portions include an inner circumferential vent for receiving a slit ring packing and rotatably engaging an outer circumferential vent of a pair of apertures formed within said windshield.

5. The method of claim 4, wherein the slit ring packing is made of rubber.

6. The method of claim 4, wherein the slit ring packing is made of silicone rubber.

7. The method of claim 1, wherein the brush includes a base having a longitudinal convex portion for mating with a longitudinal concave portion disposed on a guide member installed in each of the pair of circular windshield portions.

* * * * *